United States Patent Office 3,251,897
Patented May 17, 1966

3,251,897
ALKYLATION OF AROMATIC COMPOUNDS IN THE PRESENCE OF AN ALUMINO-SILICATE CATALYST
John J. Wise, Arlington, Mass., assignor to Socony Mobil Oil Company, Inc., a corporation of New York
No Drawing. Filed Dec. 20, 1962, Ser. No. 245,983
30 Claims. (Cl. 260—671)

This invention relates to the alkylation of hydrocarbons and substituted hydrocarbons in the presence of an alumino-silicate having catalytic activity, and in particular, alkylation of aromatic and substituted aromatic hydrocarbons in the presence of these alumino-silicate catalysts.

Both naturally occurring and synthetic alumino-silicates have been found to exhibit catalytic activity in the conversion of hydrocarbons. These alumino-silicates, known broadly as zeolites, have ordered internal structure which form internal passages, pores, or cavities of definte ranges of size. Because the dimensions of these pores serve to accept for adsorption, hydrocarbon molecules of certain dimensions and reject those of larger dimension, these materials have been referred to as "molecular sieves" and are utilized so that advantage may be taken of these properties.

This invention contemplates the alkylation of hydrocarbons and substituted hydrocarbons in the presence of a catalyst prepared from synthetic and naturally occurring alumino-silicates having base exchanged metal sites and/or acid exchanged hydrogen sites within their ordered internal structures which produce a high catalytic activity level for alkylation.

Several different alkylating agents may be used in the alkylation processes of this invention. It has been found that the use of an alumino-silicate catalyst that has been metal base exchanged or hydrogen acid exchanged, or both, so as to have a minimum level of catalytic activity, produces a high yield of alkylation products particularly at low temperatures in both liquid and mixed phases. This minimum level of activity depends upon the degree of exchange of the metal from the sites within the alumino-silicate catalyst either with the base exchanged metal or in the case of acid exchanged with hydrogen or both. While many metals may be base exchanged into the alumino-silicates to produce a catalyst having a minimum level of activity for alkylation as set forth above, the prefered metals are the rare earth metals. Also preferred is a hydrogen exchanged alumino-silicate catalyst or a catalyst containing a combination of rare earth and hydrogen sites.

Exemplary of the hydrocarbons which may be alkylated by the process of this invention, are aromatic compounds such as benzenes, naphthalenes, anthracenes, and the like and substituted derivatives thereof; alkyl substituted aromatics, e.g. toluene, xylene, and homologs thereof being preferred. In addition, other non-polar substituent groups may also be attached to the nucleus of the aromatic ring including, by way of example Methyl (—CH$_3$)
Ethyl (—C$_2$H$_5$)
Tert-butyl (—C(CH$_3$)$_3$)
Alkyl (—C$_n$H$_{(2n+1)}$)

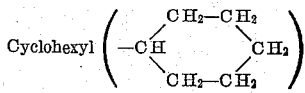

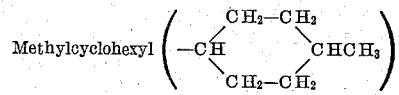

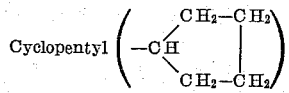

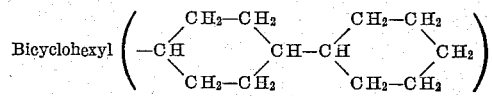

Cycloalkyl (—C$_n$H$_{(2n-1)}$)
Phenyl (C$_6$H$_5$)
Naphthyl (C$_{10}$H$_7$)

and

Aryl (any aromatic radical)

In accordance with this invention the preferred alkylating agents are olefins such as ethylene, proplyene, dodecylene and alkyl halides, alcohols and the like; the alkyl portion thereof having from 1 to 20 carbon atoms. It will be appreciated, however, that numerous other acyclic compounds having at least one reactive alkyl radical may be utilized as alkylating agents. Advantageously, it has been found that in accordance with the process of this invention, polymerization and side reactions of the alkylating agent can be reduced to a minimum by regulating the order of introducing the reactants into the reactor. Thus, the compound to be alkylated can be charged first and allowed to substantially saturate the catalyst before the alkylating agent is introduced into the reactor. In addition, it will be appreciated that when shutting down the reactor for regeneration of the catalyst or the like, the alkylating agent, particularly the olefins, should be purged from the reactor prior to stopping the entry of the compound to be alkylated.

It has also been found that the alkylation process of this invention may be carried out at temperatures not in excess of 600° F. which eliminate many undesirable reactions that occur in catalytic alkylation of hydrocarbons carried out at higher temperatures. The deleterious effects of these reactions cause several basic problems for alkylation processes. At high temperatures, the reactants and the alkylated products undergo degradation resulting in the loss of desired products and reactants. Long chain alkyl groups attached to aromatic and other cyclic hydrocarbons are shortened by this degradation to form other more stable alkyl substituents. Secondly, tarry residues are formed from the degradation reactions. In addition, olefins used as alkylating agents will polymerize with themselves or other reactants to form resinous compounds within the reaction zone. These resinous compounds together with the tarry degradation products lead to the formation of coke-like deposits on the active surfaces of the catalyst. As a result, these deposits rapidly destroy the high activity of the catalyst and greatly shorten its effective life. Consequently, frequent regeneration and by-passing of the contaminated catalyst are necessary.

It will be further be appreciated that because of the unique activity shown by the alumino-silicate catalysts contemplated by the present invention, these alkylating agents may be employed in fluid media which contain major proportions of inert diluents. The advantages of such operation will be readily be apparent because of the availabity and low cost of obtaining such dilute process streams during hydrocarbon processing. In addition, by employing dilute olefin streams the formation of polymerized products within or on the ordered internal structure of the alumino-silicate catalysts is substantially reduced. As will be more fully amplified in the examples, the concentration of these fluid streams has a pronounced effect on the catalysts employed by the process.

Either the naturally occurring or synthetic alumino-silicates may be used to form the alkylation catalyst of this invention. Among the naturally occurring crystalline alumino-silicates which can be employed are faujasite, heulandite, clinoptilolite, mordenite and dachiardite. These silicates have been found to have the ability to adsorb benzene and larger aromatic hydrocarbons.

One of the crystalline alumino-silicates which may be utilized by the present invention is the synthetic zeolite designated as zeolite X, and is represented in terms of mole ratios of oxides as follows:

$$1.0 \pm 0.2 M_{2/n}O : Al_2O_3 : 2.5 \pm 0.5 SiO_2 : YH_2O$$

wherein M is a cation having a valence of not more than 3, $n$ represents the valence of M, and Y is a value up to 8, depending on the identity of M and the degree of hydration of the crystal. The sodium form may be represented in terms of mole ratios of oxides as follows:

$$0.9 Na_2O : Al_2O_3 : 2.5 SiO_2 : 6.1 H_2O$$

zeolite X is commercially available in both the sodium and the calcium forms; the former being preferred for the purpose of the invention. It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

The preferred alumino-silicate catalysts are those derived from the class of zeolites comprising faujasite-like crystal structures. Especially preferred for the manufacture of ethylbenzene is an alumino-silicate catalyst characterized by uniform pore openings of at least 10 Angstrom units in diameter and an activity constant, as hereinafter defined, of between about 500 and about 1000 prepared from the sodium form of zeolite X as the result of a conventional treatment involving partial replacement of the sodium by contact with a fluid medium containing cations of at least one of the rare earth metals. Any medium which will ionize the cation without affecting the crystalline structure of the zeolite may be employed. After such treatment, the resulting exchanged product is water washed, dried and dehydrated. The dehydration thereby produces the characteristic system of open pores, passages or cavities of crystalline alumino-silicates.

As a result of the above treatment the rare earth exchanged alumino-silicate is an activated crystalline catalyst in which the nuclear structure has been changed only by having metallic rare earth cations chemisorbed or ionically bonded thereto. Because specific rare earth cations as well as a mixture of several different rare earth cations may be base exchanged or otherwise incorporated in the alumino-silicates, it will be understood that advantageously, the sodium content of the activated catalyst provides a measure of the completeness of the cation exchange. Accordingly, as contemplated by this invention, the activated catalyst may contain up to 5 percent by weight and preferably under 1 percent by weight of sodium after such treatment. In addition, it will be understood that the pore size of the rare earth exchanged catalyst may vary from above 6 A. generally 6 to 15 A. and preferably in the approximate range of 10 to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodyamium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 56–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

In accordance with this invention, the preferred catalyst for low temperature, high conversion, alkylation is a rare earth exchanged, crystalline, synthetic alumino-silicate, but other alumino-silicates are contemplated as also being effective catalytic materials for the invention. Of these other alumino-silicates, a synthetic zeolite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O : Al_2O_3 : WSiO_2 : XH_2O$$

wherein "W" is a value greater than 3 up to about 6 and "X" may be a value up to about 9.

The selectivity of zeolite Y for larger molecules is appreciably the same as zeolite X because its pore size extends from 10 to 13 Angstrom units.

Zeolite Y may be activated by the same base exchange techniques employed for the rare earth exchanged zeolite X catalyst. In addition, it has been found that the exchange of rare earth metals for the sodium ion within zeolite Y produces a highly active catalyst. However, because of its high acid stability the preferred form of zeolite Y is prepared by partially replacing the sodium ion with hydrogen ions. This replacement may be accomplished by treatment with a fluid medium containing a hydrogen ion or an ion capable of conversion to a hydrogen ion. Inorganic and organic acids represent the source of hydrogen ions, whereas ammonium compounds are representative of the cations capable of conversion to hydrogen ions. It will be appreciated that the fluid medium may contain a hydrogen ion, an ammonium ion or mixture thereof, in a pH range from about 1 to about 12.

Another alumino-silicate material found to be active in the present alkylation process is a naturally occurring zeolite known as mordenite. This zeolite is an ordered crystalline structure having a ratio of silicon atoms to aluminum atoms of about 5 to 1. In its natural state it usually appears as a mixed sodium-calcium salt which after exchange of metal ions with hydrogen shows adsorption for benzene.

Mordenite differs from other known zeolites in that ordered crystalline structure is made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameter. As a result of this different crystalline framework, mordenite can adsorb simple cyclic hydrocarbons, but cannot accept the larger molecules which will be adsorbed by zeolite X and zeolite Y. As a consequence of this smaller pore size it has been found that mordenite is more rapidly deactivated than either the rare earth exchanged zeolite X or zeolite Y in the production of ethylbenzene under the operating conditions of the present process.

Mordenite is activated to serve as a catalyst for the instant invention by replacement of the sodium ion with hydrogen ion. The necessary treatment is essentially the same as that described above for the preparation of the acid zeolite Y. In general the mordenite is reduced to a fine powder (approximately passing the 200 mesh sieve and preferably passing 300 or 325 mesh sieves or finer) and then acid treated.

The effectiveness of the alumino-silicate catalyst heretofore described, as exemplified by its level of activity, is governed by the degree to which metallic or acid cations have been chemisorbed or ionically bonded within its ordered internal structure; in other words, the sodium content reflects the activity of the alumino-silicate catalysts. Since the catalytic activity of the rare earth exchanged and hydrogen exchanged alumino-silicates is a function of the character of the active sites produced by the cations incorporated within its ordered internal structure, as well as the remaining sodium content, a test method has been developed to measure the unique activity of the catalysts.

In conducting the test, n-hexane is fed to a reactor which contains a catalyst to be evaluated. The flow rate of the n-hexane, catalyst sample size and temperature in the reactor are preselected to obtain conversion levels in the range of 5 to 50 weight percent. The hexane is fed to the reactor until the catalyst to hexane ratio (volume basis) equals about 4. At this time a sample of the reaction products is taken and analyzed by gas chromatography.

The conversion of n-hexane determined from the chromatograph is converted to a reaction rate constant by the assumption of a first order or pseudo-first order reaction. Some trial and error may be necessary to select particular conditions. As a general guide, space velocity and temperature can be varied until a conversion is in the above range. If it should happen that the catalyst has a heavy coke deposit at low conversion severity should be decreased. The value obtained is normalized by dividing by the reaction rate constant for a conventional silica-alumina catalyst containing about 10 weight percent alumina and a Cat–A activity of 46 as described in National Petroleum News 36, page P.R.–537 (August 2, 1944). Such catalyst is hereinafter designated as 46AI silica-alumina catalyst. This value is then corrected to 1000° F. by the use of an Arrhenius plot if the evaluation occurred at some other temperature. Results are therefore reported as relative reaction rate constants at 1000° F.

The range of operating conditions for this test are as follows:

Temperature in reactor _____° F__ 700 to 1000
Liquid hourly space velocity _____ 0.2 to 60
n-Hexane flow rate _____cc./hr__ 2 to 30
Catalyst volume in reactor _____cc__ 0.5 to 10

The test conditions are usually chosen so that time on stream is between 15 seconds and 30 minutes and preferably between 30 seconds and 15 minutes.

In accordance with this invention the alumino-silicate catalysts are prepared to have at least a specified minimum level of unique activity; thereby promoting high conversion, low temperature alkylation. Advantageously, it has been found that a catalyst having an activity constant about 10 and preferably above 50 as determined by the above described test will provide efficient alkylation at temperatures below 700° F. and at hourly liquid space velocities on the order of 5 to 25. For manufacture of ethylbenzene, the alumino-silicate catalyst employed preferably is characterized by an activity constant, above defined, of at least 100 and more particularly in excess of 400. It is particularly preferred that the catalysts contemplated by the process of this invention possess an activity constant greater than 1500.

It will be understood that the catalytic materials of the present invention may be treated with metallic or ammonium cations to provide a sodium content corresponding to the desired activity level. For example, a particularly active catalyst can be produced by further base exchanging a rare earth exchanged zeolite X with an ammonium salt such as $NH_4Cl$ which forms acid sites on calcination within its ordered internal structure.

In accordance with the invention, the activity of the alumino-silicate catalyst is also affected by the availability of the active sites within its ordered internal structure. It will be appreciated that the pore sizes of the catalysts determine whether a compound of specific molecular dimensions can contact the active sites by passing through its ordered internal structure. Accordingly, catalysts having larger pore size effectively promote alkylation for a greater range of different aromatic compounds. In addition, the rate of deactivation of the catalyst, as exemplified by the longer life of zeolite X when compared with acid mordenite, is substantially affected by the pore sizes. Apparently, larger pore sizes allow the reactants to pass more freely through the ordered internal structure; thereby facilitating shorter contact times which prevent product degradation. Furthermore, larger pore sizes accommodate greater accumulation of tarry residues before becoming blocked and deactivated.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of example, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Serial No. 430,212, filed February 3, 1965, by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed to be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such silica-alumina-thoria, silica-alumina-zirconia, silica-alumina-magnesia and silica-magnesia-zirconia. In the forgoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho-silicate acidification of an alkali metal silicate and a salt of a metal, the oxide of which is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the present process may be used in the form of small fragments of a size best suited for operation under the specific conditions existing. Thus, the catalyst may be in the form of the finely divided powder or may be in the form of pellets of $\frac{1}{16}''$ to $\frac{1}{8}''$ size, for example, obtained upon pelleting the crystalline alumino-silicate with a suitable binder such as clay. The commercially available material, described hereinabove, may be obtained on a clay-free basis or in the form of pellets in which clay is present as a binder.

The following table illustrates a comparison of reaction rate constants for alumino-silicate catalysts having various percentages by weight of sodium remaining in them after acid and base exchange, using silica-alumina as a basis.

TABLE I.—n-HEXANE CRACKING

| Catalyst | Na Content, Wt. Percent | Activity Constant at 1000° F. |
| --- | --- | --- |
| Silica-alumina | | [1] 1.0 |
| Sodium zeolite X | 14.4 | 1 |
| Rare earth exchanged Zeolite X | 0.39 | 4,100.0 |
| Do | 0.52 | 4,000.0 |
| Do | 0.74 | 2,400.0 |
| Acid mordenite | | 600.0 |
| Acid zeolite Y | 1.22 | 570.0 |
| Rare earth exchanged Zeolite X | 1.7 | 320.0 |
| Do | 2.7 | 72.0 |
| Do | 6.2 | 10.2 |

[1] Basic.

It can be seen from the above table that the relative reaction rate constant varies inversely to the amount of sodium remaining in the catalyst. Thus, a residual sodium ion content of less than 0.7 percent by weight of the catalyst gives a reaction rate constant in the thousands. Acid zeolite Y with a 1.22 percent by weight of sodium content produces a reaction rate constant of over 500. Acid mordenite with low sodium content also produces a high reaction rate constant when compared to an alumino-silicate catalyst.

It will be appreciated that the opening conditions employed by the present invention will be dependent on the specific alkylation reaction being effected. Such conditions as temperature, pressure, space velocity and molar ratio of the reactants and the presence of inert diluents will have important affects on the process. Accordingly, the manner in which these conditions affect not only the conversion and distribution of the resulting alkylated products but also the rate of deactivation of the catalyst will be described below.

The process of the invention may be more readily understood by reference to the following examples of specific alkylation reactions. The reactions were conducted in a tubular glass reactor containing a bed of the alkylation zeolite catalyst having a particle size of 8–14 mesh. Gaseous reactants were metered from cylinders and introduced into the reactor above the catalyst bed. Likewise, reactants which are liquid at room temperature were pumped into the reactor above the bed. The effluent containing alkylation products was periodically collected and analyzed.

ALKYLATION OF BENZENE WITH OLEFINS

*Example 1*

To exemplify the high conversion achieved by the rare earth exchanged alumino-silicate catalyst, reference is made to the alkylation of benzene with ethylene. As shown in Table II below, in the presence of a conventional silica alumina cracking catalyst, having an activity index of 46, benzene did not react with ethylene at temperatures of about 415° F. In contrast benzene and ethylene, when contacted with the present catalyst, react to form ethylbenzene and other alkylbenzenes; the conversion of ethylene to ethylbenzene being on the order of 90%.

TABLE II.—CATALYST ACTIVITY COMPARISON IN BENZENE-ETHYLENE ALKYLATION

Conditions:
 Temperature—415° F.
 Pressure—Atmospheric
 Benzene/ethylene ratio (molar)—12/1
 Benzene space velocity, vol. benzene/vol. catalyst/hr.—12

| | Rare Earth (RE) Exchanged [1] Zeolite X | 46AI Silica Alumina |
| --- | --- | --- |
| Time on Stream, min | 90 | 90 |
| Product Analysis, Wt. Percent: | | |
| Benzene | 91.2 | 100.0 |
| Ethylbenzene | 8.4 | 0.0 |
| Other alkylbenzenes [2] | 0.4 | 0.0 |
| | 100.0 | 100.0 |
| Conversion of ethylene to ethylbenzene, percent | 91.5 | 0.0 |

[1] 26.5% wt. (RE)$_2$O$_3$. 0.22% wt. Na, 13X zeolite.
[2] Diethylbenzenes, and toluene.

*Example 2*

Because the life of the catalyst, as well as its activity, are important considerations in catalytic operations, tests were made to determine the affects of temperature, pressure, and the ratio of benzene to ethylene on the effectiveness of the catalyst in the alkylation of benzene with ethylene in accordance with the present invention.

For example, in an experiment in which benzene and ethylene were passed into a fixed bed reactor at a molar ratio of 12/1, and a benzene space velocity on the order of 12 (volume of benzene/volume of catalyst/hour) at atmospheric pressure the following results were observed:

TABLE III

| Minutes on Stream | Product Composition, Wt. Percent | | | Temperature, °F. |
|---|---|---|---|---|
| | Ethylbenzene | Other | Total | |
| 50 | .4 | .4 | .8 | 250 |
| 100 | .3 | .3 | .6 | 250 |
| 150 | .20 | .20 | .4 | 250 |
| 200 | 3.5 | 1.0 | 4.5 | 350 |
| 250 | 3.1 | 0.9 | 4.0 | 350 |
| 300 | 2.8 | .8 | 3.6 | 350 |
| 400 | 3.5 | 1.0 | 4.5 | 415 |
| 500 | 3.1 | 0.8 | 3.9 | 415 |
| 600 | 2.7 | 0.6 | 3.3 | 415 |

From this and similar experiments, it was found that the aging or deactivation of the catalyst when operating at vapor phase conditions is greatly affected by the molar ratio between benzene and ethylene entering the reaction zone. At high ratios, on the order of 12/1, the rate of deactivation is approximately ¼ less than at a benzene-ethylene ratio of 3/1. On the other hand, the initial yield of ethylene at a 3/1 benzene to ethylene ratio is about 40% of the total product distribution. Nevertheless, this yield rapidly declines due to the deactivation of the catalyst. A possible explanation for this aging effect is that the presence of larger amounts of ethylene causes the formation and accumulation of polyethylbenzenes within the pores of the catalyst.

At elevated temperatures, as expected, the rate of activity is initially greater, but the life of the catalyst is shortened in comparison with that at lower operating temperature. Unexpectedly, the significant effect of temperature on the effectiveness of the catalyst is to change its selectivity and consequently the nature and distribution of the products of alkylation. At temperatures of about 500° F. or more the number of products having long chain alkyl groups is reduced, with a corresponding increase in the number of lesser molecular weight alkyl substituents. For instance, in this range of temperature, the presence of toluene becomes noticeable due to the cracking of ethylbenzene.

Very low temperatures (less than about 250° F.) during vapor phase operation, cause the product distribution to be altered by the increased presence of diethylbenzene and other polyalkylated benzene. These polyalkyls apparently result from the extended residence time of the reactants in the catalyst because of the lower rates of diffusion through the catalyst pore structure. Accordingly, in order to produce ethylbenzene the preferred operating temperatures in vapor phase extend from about 250° F. to 600° F.

*Example 3*

The rare earth alumino-silicate used above was regenerated by burning in air at 900° F. and retested. After 90 minutes on stream, the weight percent of ethylbenzene in the products was about 8.4, indicating that the catalyst may be regenerated to full activity.

*Example 4*

The alkylation of benzene with ethylene at a temperature of about 425° F. and at atmospheric pressure was repeated first in the presence of the acid zeolite Y catalyst and then the acid mordenite catalyst. The results of these runs are as follows:

TABLE IV

| | Acid Zeolite Y [1] | Acid Mordenite |
|---|---|---|
| Time on stream, minutes | 45 | 23 |
| Benzene/Ethylene ratio (molar) | 12/1 | 12/1 |
| Product composition, wt. percent: | | |
| Benzene | 95.9 | 94.6 |
| Ethylbenzene | 3.9 | 4.7 |
| Polyalkylbenzene | 0.2 | 0.7 |
| Total | 100.0 | 100.0 |
| Conversion of ethylene, percent of charge | 44 | 58 |
| Ethylene converted to ethylbenzene, percent of charge | 42 | 52 |

[1] 1.22% by weight sodium.

From the above data it will be seen that acid mordenite and acid zeolite Y both show good catalytic activity. However, from similar experiments, it has been found that acid zeolite Y maintains a higher level of activity than acid mordenite for extended periods of time.

*Example 5*

The effects of pressure on the rate and duration of the catalytic activity in the alkylation of benzene with ethylene are manifested by the resulting phase relationship existing in the reactor.

Vapor phase alkylation prevails during operation at atmospheric pressure. As previously illustrated in Table III, complete conversion of the ethylene is initially obtained in vapor phase alkylation, but it has also been determined that after six hours of operation, the activity of the catalyst decreases to approximately one-half of its original value.

In contrast, it has been found that the unique activity of the alumino-silicate catalysts of this invention can be maintained for greatly extended periods by operating under sufficient pressure to keep the alkylatable aromatic compounds in the liquid phase. Accordingly, it is preferable to conduct the process below the critical temperature at whatever pressure is required to liquefy one or more of the reactants, preferably the alkylatable compound. At elevated pressures, the flow of liquid aromatic compounds, i.e., benzene, is believed to prolong the catalyst activity by preventing the formation of olefinic polymers and by washing out or solubilizing the by-product polyalkyl aromatics from the ordered internal structure of the catalyst.

In addition, it will be understood that during this liquid or mixed liquid-vapor phase operation, the deactivation rate of the catalyst, unlike vapor phase operation, is less influenced by the molar ratio between the reactants; therefore, in accordance with this invention, lower ratios may be employed to obtain high yields of the desired mono-alkyl substituted aromatic compounds. As illustrated in Table V below, when operating under mixed vapor-liquid phase conditions (approximately 500 p.s.i.g.) the active life of the catalyst is increased from a period of hours in vapor phase operation to several days in mixed phase operation.

TABLE V.—VAPOR-LIQUID PHASE ALKYLATION OF BENZENE OVER RARE EARTH-ACID ZEOLITE X CATALYST [2]

| Time on stream, hr | 47 | 71 | 79 |
|---|---|---|---|
| Conditions: | | | |
| Temp. (hottest point) °F | 440 | 450 | 435 |
| Pressure, p.s.i.g | 500 | 500 | 500 |
| LHSV, vol. BZ/vol. cat./hr | 4 | 4 | 4 |
| Benzene/ethylene/$N_2$ ratio | 7.7/1/1 | 4.3/1/0.6 | 7.7/1/1 |
| Product composition, wt. percent: | | | |
| Benzene | 84.6 | 74.3 | 83.0 |
| Ethylbenzene | 13.2 | 20.8 | 14.3 |
| Polyethylbenzenes [1] | 2.2 | 4.9 | 2.7 |
| | 100.0 | 100.0 | 100.0 |
| Conversion of ethylene, percent | 100 | 100 | 100 |
| Ethylene converted to ethylbenzene, percent | 78 | 72 | 76 |

[1] Mainly diethylbenzenes.
[2] 0.22% wt. sodium, 8-14 mesh particles.

It will be noted from the above data, much lower rates of catalyst deactivation result from the mixed liquid-vapor phase operation. At relatively low benzene to ethylene molar ratios, which under vapor phase conditions would have quickly caused deactivation, the rare earth exchanged zeolite X maintains its unique catalytic activity for a period of 79 hours. (Because of complete conversion of ethylene, the introduction of a small amount of nitrogen was necessary to keep the reactor under a 500 p.s.i.g. pressure.) This unique activity gave complete conversion of the ethylene to alkyl benzenes for the entire 79-hour period. In addition, the percent conversion of ethylene to ethylbenzene advantageously remained significantly high. As to be expected, the degree of catalyst selectivity for ethylbenzene was reduced when the alkylation was effected at the more severe benzene to ethylene ratio of 4.3/1.

It will be appreciated that this extended, high rate of catalytic activity achieved by the mixed liquid-vapor phase operation provides an alkylation process heretofore not possible in the field of hydrocarbon alkylation.

*Example 6*

Liquid phase alkylation of benzene with ethylene, is also contemplated by the present invention as illustrated in Table VI below. This method of operation likewise provides less severe deactivation of the rare earth exchanged alumino-silicate catalyst than the use of a vapor phase.

TABLE VI.—MIXED PHASE ALKYLATION OF BENZENE WITH ETHYLENE IN CONTACT WITH RARE EARTH EXCHANGED ZEOLITE AND ACID ZEOLITE Y

| | Rare Earth Exchanged Zeolite [2] | Acid Zeolite [3] |
|---|---|---|
| Time on stream, hr | 20 | 19 |
| Conditions: | | |
| Temp. (hottest spot), °F | 440 | 415 |
| Pressure, p.s.i.g | 500 | 400 |
| LHSV, vol. BZ/vol. cat./hr | 4 | 4 |
| Benzene/ethylene molar ratio | 5.3/1 | 6.1/1 |
| Product composition, wt. percent: | | |
| Benzene | 78.1 | 81.6 |
| Ethylbenzene | 17.0 | 14.8 |
| Polyethylbenzene [1] | 4.7 | 3.6 |
| Total | 100.0 | 100.0 |
| Conversion of ethylene, percent | 100 | 100 |
| Ethylene converted to ethylbenzene percent | 71 | 71 |

[1] Mainly diethylbenzenes.
[2] 0.32% wt. sodium, 8-14 mesh particles.
[3] 1.22% wt. sodium, 8-14 mesh particles.

From the above data, it will be seen that rare earth exchanged zeolite and acid zeolite Y catalysts give similar percentages of conversion of ethylene to ethylbenzene over substantially a 20-hour period under similar conditions.

*Example 7*

Alkylation of benzene with propylene to form cumene over the rare earth exchanged alumino-silicate catalyst occurs similarly to the benzene-ethylene reaction, with the preferred operating temperatures extending from about 100° F. to 600° F. For example, the following experiment was conducted for an extended period in a fixed bed reactor at atmospheric pressure: benzene and propylene at a molar ratio of 3/1 and at a benzene hourly space velocity of 2, where reacted to form cumene and other alkylation products, such as diisopropylbenzene.

TABLE VII.—VAPOR-PHASE ALKYLATION OF BENZENE-PROPYLENE OVER RARE EARTH CATALYST

| Time on stream, min | 50 | 75 | 115 | 150 |
|---|---|---|---|---|
| Temperature, °F | 300 | 300 | 440 | 440 |
| Product composition, wt. percent: | | | | |
| Cumene | 9.0 | 7.5 | 23.0 | 10.5 |
| Other | 0.3 | 0.5 | 9.5 | 6.5 |
| Total | 9.3 | 8.0 | 32.5 | 17.0 |

*Example 8*

The rare earth exchanged alumino-silicate contemplated by the present invention has also shown high catalytic activity for the alkylation of aromatics with alkyl halides. For example, benzene can be alkylated with ethylchloride at relatively low temperatures.

When contrasted with a 46AI silica alumina catalyst, the present catalyst exhibited the following high activity for the alkylation of benzene with ethylchloride at a temperature of 425° F. and at atmospheric pressure, the molar ratio of benzene to ethylchloride being 12/1.

TABLE VIII.—CATALYTIC ACTIVITY COMPARISON IN BENZENE-ETHYL CHLORIDE ALKYLATION

| Time on stream, min | 50 | 100 | 200 | 350 |
|---|---|---|---|---|
| Wt. Percent Ethylbenzene in Products: | | | | |
| Rare earth exchanged zeolite | 5.5 | 7.2 | 8.2 | 8.2 |
| 46AI silica alumina | 0.3 | 0.3 | | |

From the above data, it is evident that the activity of the rare earth alumino-silicate is much higher than that of the 46AI silica alumina. These data are representative of one operable temperature; preferably the alkylation of benzene with ethyl chloride may be effected from 100° to 600° F.

It will be understood that other alkyl halides containing up to 20 carbon atoms can be used as alkylating agents in accordance with this invention and that the instant example is merely illustrative of the high rates of conversion achieved by such alkyl halides.

*Example 9*

The catalyst prepared from the rare earth exchanged alumino-silicate also exhibits high capability for the alkylation of polycyclic hydrocarbons such as naphthalene. As shown by the following data at the relatively low temperature of 425° F. and at atmospheric pressure, naphthalene is alkylated with propylene to form isopropyl-naphthalene.

TABLE XI.—NAPHTHALENE-OLEFIN ALKYLATION

| Minutes on stream | Product composition, wt. percent | | |
|---|---|---|---|
| | Isopropyl-naphthalene | Other | Total |
| 50 | 18.5 | 1.5 | 20.0 |
| 100 | 14.0 | 1.0 | 15.0 |
| 150 | 11.0 | 0.5 | 11.5 |

The hourly space velocity of naphthalene was about 1 at a naphthalene-propylene ratio of approximately 3/1. The other alkylated products of this reaction were primarily di- and tri-isopropylnaphthalenes.

Example 10

A liquid charge of a benzene-ethanol mixture of a 5 to 1 molar ratio at a liquid hourly space velocity of 14 was contacted with a rare earth exchanged zeolite X catalyst at a temperature of 400° F. and at atmospheric pressure. After 25 minutes on stream, a sample of the reaction products contained about 7% by weight of ethyl benzene, about 3% by weight of diethylbenzenes, and about 11% by weight of other polyalkyl benzenes. Water was also produced in a separate phase from the organic products.

During the same run, when the temperature was raised to about 500° F. (all other variables substantially unchanged), a sample containing about 9% by weight of ethyl benzene, 3% by weight of diethyl benzenes, and about 1% by weight of other polyalkyl benzenes was obtained after 125 minutes on stream.

The temperature was then raised to 600° F. (all other variables being substantially unchanged), and a sample containing about 10% by weight of ethyl benzene, about 2% by weight of diethylbenzenes, and about 0.5% by weight of other polyalkyl benzenes was obtained after 185 minutes on stream.

The results of this run show that paraffinic alcohols provide effective alkylating agents in the presence of a rare earth exchanged zeolite X catalyst for forming the alkylated aromatic compounds contemplated by this invention.

It will be appreciated that the examples set forth above are merely illustrative of the different hydrocarbons and substituted hydrocarbon compounds which may be alkylated in accordance with the present invention and that other organic compounds can be alkylated in accordance with the process of this invention.

It will also be appreciated that the operating conditions for the alkylation reactions in accordance with the process of this invention, as exemplified in the foregoing examples, may be varied so that the process can be conducted in gaseous phase, liquid phase, or mixed liquid-vapor phase, depending on product distribution, degree of alkylation, rate of catalyst deactivation, and operating pressures and temperatures, and that various modifications and alterations may be made in the process of this invention without departing from the spirit of the invention.

What is claimed is:

1. A process for producing alkylated organic compounds which comprises effecting reaction at a temperature not in excess of 600° F. of an alkylating agent and an organic compound selected from the group consisting of aromatic hydrocarbons and aromatic hydrocarbons containing a non-polar substiutent in the the presence of a catalyst comprising a crystalline alumino-silicate which contains cations selected from the group consisting of rare earth metals, hydrogen, and mixtures thereof, characterized by an activity constant of above about 50 and a uniform pore size of at least about 6 Angstrom units.

2. The process of claim 1 in which the reaction takes place at a temperature between about 100° F. and about 600° F.

3. The process of claim 1 in which the aromatic hydrocarbons include benezenes, naphthalenes, phenanthrenes and anthracenes.

4. The process of claim 1 in which the alkylating agent is selected from the group consiting of olefins containing from 2 to 20 carbon atoms, alkyl halides and aliphatic alcohols containing from 1 to 20 carbon atoms in the alkyl group.

5. The process as claimed in claim 1 in which the reaction is conducted under sufficient pressure to maintain said organic compound in a liquid phase.

6. The process of claim 1 in which said organic compound is allowed to saturate the catalyst before the alkylating agent is in the presence of said catalyst.

7. A process of claim 1 in which said alumino-silicate zeolite is selected from the group consisting of rare earth exchange zeolite X, rare earth-acid exchanged zeolite X, acid mordenite, acid zeolite Y and rare earth exchanged zeolite Y.

8. The process for producing alkyl-substituted benzenes which comprises effecting reaction at a temperature not in excess of 600° F. of benzene and an alkylating agent selected from the group consisting of olefins containing from 2 to 20 carbon atoms, alkyl halides, and aliphatic alcohols containing from 1 to 20 carbon atoms in the alkyl group in the presence of a catalyst comprising a crystalline alumino-silicate which contains cations selected from the group consisting of rare earth metals, hydrogen and mixtures thereof characterized by an activity constant of above 50 and a uniform pore size of from 6 to 15 A. and recovering an alkyl-substituted benzene product.

9. The process of claim 8 in which the reaction is conducted at a temperature from 100° F. to 600° F.

10. The process of claim 8 in which said alumino-silicate zeolite is selected from the group consisting of rare earth exchanged zeolite X, rare earth-acid exchanged zeolite X, acid zeolite Y, acid mordenite and rare earth exchanged zeolite Y.

11. The process for producing ethylbenzene which comprises effecting reaction at a temperature not in excess of 600° F. of benzene and ethylene at a pressure sufficient to maintain benzene in the liquid phase in the presence of a catalyst consisting essentially of a rare earth exchanged zeolite X characterized by an activity constant of at least 100 and a uniform pore size of at least about 6 Angstrom units and recovering the ethylbenzene product.

12. The process of claim 11 in which the activity constant of said catalyst is above 400.

13. The process of claim 11 in which the catalyst is substantially saturated with benzene before the ethylene is in the presence of said catalyst.

14. The process of claim 13 in which the ethylene is in a fluid medium containing a major proportion of an inert diluent.

15. A process for producing cumene which comprises effecting reaction of benzene and propylene at a temperature not in excess of 600° F. in the presence of a catalyst consisting essentially of a rare earth exchanged zeolite X characterized by an activity constant of at least 100 and a uniform pore size of at least about 6 Angstrom units, and recovering a cumene product.

16. A process for producing dodecylbenzene which comprises effecting reaction of benzene and dodecylene at a temperature of from 100° F. to 600° F. in the presence of a catalyst consisting essentially of a rare earth exchanged zeolite X characterized by an activity constant of at least 100 and a uniform pore size of at least about 6 Angstrom units, and recovering a dodecylbenzene product.

17. The process for producing ethylbenzene which comprises effecting reaction of benzene and ethyl chloride at temperature of from 100° F. to 600° F. in the presence of a catalyst consisting essentially of a rare earth exchanged zeolite X, characterized by an activity constant of at least 100 and a uniform pore size of at least about 6 Angstrom units and recovering the ethylbenzene product.

18. A process for producing cumene which comprises effecting reaction of benzene and propyl chloride at a temperature of from 100° F. to 600° F. in the presence of a catalyst consisting essentially of a rare earth exchanged zeolite X, characterized by an activity constant of at least 100 and a uniform pore size of at least about 6 Angstrom units, and recovering a cumene product.

19. A process for producing dodecylbenzene which comprises effecting reaction of benzene and dodecylchloride at a temperature of from 100° F. to 600° F. in the presence of a catalyst consisting essentially of a rare earth exchange zeolite X characterized by an activity constant of at least 100 and a uniform pore size of at least about 6 Angstrom units, and recovering a dodecylbenzene product.

20. The process for producing an alkylated naphthalene which comprises effecting reaction of a naphthalene and an olefin containing from 2 to 12 carbon atoms at a temperature from 100° F. to 600° F. in the presence of a catalyst comprising a crystalline alumino-silicate which contains cations selected from the group consisting of rare earth metals, hydrogen and mixtures thereof characterized by an activity constant of above 50 and a uniform pore size of from 6 to 15 A. and recovering an alkylated naphthalene product.

21. The process of claim 20 in which the said aluminosilicate zeolite is selected from the group consisting of rare earth exchanged zeolite X, rare earth-acid exchanged zeolite X, acid zeolite Y, acid mordenite and rare earth exchanged zeolite Y.

22. The process for producing isopropylnaphthalene which comprises effecting reaction of naphthalene and propylene at a temperature from about 100° F. to 600° F. in the presence of a catalyst consisting essentially of a rare earth exchange zeolite X having an activity constant of at least above 50 at least a minimum level of activity and a defined pore size of from 10 A. to 13 A. within an ordered internal structure and recovering the isopropylnaphthalene product.

23. A process for producing ethylbenzene which comprises effecting reaction of benzene and ethylene at a molar ratio of at least 5 to 1 and at an hourly space velocity of 4 at a pressure of from 400 to 500 p.s.i.g. and a temperature of from 400° to 500° F. in the presence of a catalyst comprising a crystalline alumino-silicate which contains cations selected from the group consisting of rare earth metals, hydrogen and mixtures thereof, characterized by an activity constant above 400 and a uniform pore size of from 6 to 15 A.

24. A process for producing an alkylated aromatic compound which comprises effecting reaction at a temperature not in excess of 600° F. of an aromatic compound having at least one of its ring hydrogen atoms substituted with a non-polar group, and an alkylating agent in the presence of a catalyst comprising a crystalline alumino-silicate which contains cations selected from the group consisting of rare earth metals, hydrogen and mixtures thereof, characterized by an activity constant of above about 50 and a uniform pore size of at least about 6 Angstrom units.

25. The process for producing diethylbenzene which comprises effecting reaction at a temperature not in excess of 600° F. of benzene and ethylene at a pressure sufficient to maintain benzene in the liquid phase in the presence of a catalyst which contains cations selected from the group consisting of rare earth metals, hydrogen and mixtures thereof, characterized by an activity constant of above 50, and a uniform pore size of from 6 to 15 A. and recovering the diethylbenzene product.

26. The process of claim 1 in which said crystalline alumino-silicate is a rare earth exchanged zeolite X.

27. The process of claim 1 in which said crystalline alumino-silicate is an acid zeolite Y.

28. The process of claim 1 in which said organic compound is benzene, and said alkylating agent is ethylene.

29. The process of claim 1 in which said crystalline alumino-silicate is contained in, and distributed throughout an inorganic oxide matrix therefor.

30. A process for producing ethylbenzene which comprises effecting reaction of benzene and ethanol at a temperature not in excess of 600° F. in the presence of a catalyst consisting essentially of a rare earth exchanged zeolite X, characterized by activity constant of at least 100 and recovering the ethylbenzene product.

References Cited by the Examiner

UNITED STATES PATENTS

| 2,904,607 | 9/1959 | Mattox et al. | 260—671 |
|---|---|---|---|
| 2,971,903 | 2/1961 | Kimberlin et al. | 208—119 |
| 2,971,904 | 2/1961 | Gladrow et al. | 208—135 |
| 3,033,778 | 5/1962 | Frillette | 208—120 |
| 3,121,754 | 2/1964 | Mattox et al. | 260—671 |

DELBERT E. GANTZ, *Primary Examiner.*

ALPHONSO D. SULLIVAN, *Examiner.*

J. E. DEMPSEY, C. R. DAVIS, *Assistant Examiners.*